May 16, 1972  E. RAMOS-RODRIGUEZ  3,663,612
METHOD OF SEPARATING LEVULINIC ACID AS AN ALKALINE-EARTH
LEVULINATE FROM HEXOSE-CONTAINING
CARBOHYDRATE SUBSTRATES
Filed Aug. 8, 1969  6 Sheets-Sheet 1

INVENTOR
EMILIANO RAMOS-RODRIGUEZ
BY
Scrivener, Parker, Scrivener & Clarke
ATTORNEYS

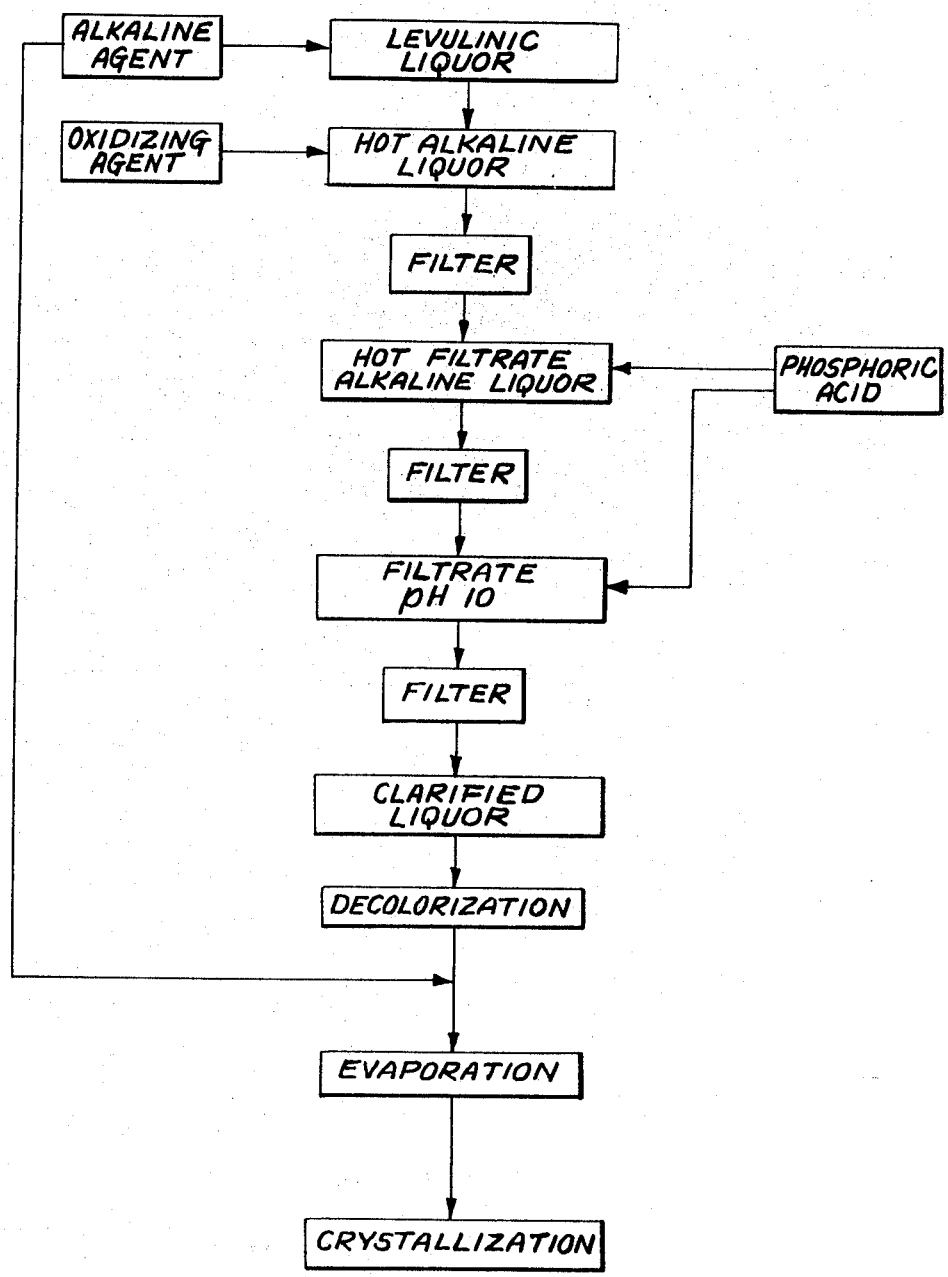

United States Patent Office 3,663,612
Patented May 16, 1972

3,663,612
METHOD OF SEPARATING LEVULINIC ACID AS AN ALKALINE-EARTH LEVULINATE FROM HEXOSE-CONTAINING CARBOHYDRATE SUBSTRATES
Emiliano Ramos-Rodriguez, San Juan, Puerto Rico, assignor to the Government of the Commonwealth of Puerto Rico
Filed Aug. 8, 1969, Ser. No. 848,462
Int. Cl. C07c 51/42
U.S. Cl. 260—527 R                        17 Claims

ABSTRACT OF THE DISCLOSURE

A method of clarification is provided for separating levulinic acid as alkaline earth levulinate directly from the liquor that is produced in the treatment of sugar solutions, starch, lignocellulosic materials and related products with catalysts of mineral or organic acids in the presence of heat and pressure. The method includes treatment of the liquor with an alkaline agent such as alkaline earth hydroxide to neutralize the liquor, raise the pH, separate impurities and produce alkaline earth levulinate and further treatment of the liquor with oxidant, phosphoric acid and additional alkaline agent to bleach, decompose and separate impurities and destroy foaming compounds. The clarified solution produced by this process contains alkaline earth levulinate which easily yields said alkaline earth levulinate on evaporation and crystallization.

BACKGROUND OF THE INVENTION AND DESCRIPTION OF THE PRIOR ART

The liquor (e.g., the liquor which is found in the hydrolizates of lignocellulosic materials, e.g., bagasse, straw and wood) that is produced in the treatment of sugar solutions, starch, lignocellulosic materials and related products with heat and pressure in the presence of catalysts comprising mainly mineral or organic acids contains a complex mixture of components such as furfural, hydroxymethyl furfural, methylfurfural, lactones, humic acids, formic acid, acetic acid, residual sugars, heavily foaming compounds, catalytic acids, etc., in addition to levulinic acid. These components make it difficult to affect a high yield recovery of levulinic acid because they may react with the levulinic acid or adversely affect the mutual solubility of levulinic acid and various solvents normally used for extracting the levulinic acid. In all cases the overall yields of levulinic acid obtained by prior methods are lower than the yields obtained by the method of clarification described herein. In prior extraction methods, the extraction requires expensive solvents and equipment and requires, for high purity, the distillation of the levulinic acid under reduced pressure and steam to minimize the accompanying losses due to lactonization and/or polymerization, all of which tend to reduce the yield and increase the expense in equipment and operation.

The complexity of the mixture in which levulinic acid is found in the hydrolizates prevents a direct economical separation of levulinic acid as alkaline earth levulinate because color reverts if a decolorizer is used on the liquor and foaming tendencies in the crude levulinate solution occur which cause considerable difficulties in evaporating and, moreover, the concentrated crude levulinates resist crystallization since impurities inhibit this operation almost completely.

GENERAL DESCRIPTION OF THE INVENTION

The present invention is directed to a method of clarification for separating levulinic acid as alkaline earth levulinate and particularly as calcium levulinate directly from the liquor produced in the treatment of said sugar solutions, starch, lignocellulosic materials and related products.

An object of the present invention is the effective and economic recovery of levulinic acid as alkaline earth levulinate from said liquor.

The method of the present invention results in breaking open the ring structure in lactones present in the liquor, bringing about an unexpected increase in the yield of alkaline earth levulinate (Table I), the destruction of foaming compounds and the precipitation of impurities. The liquor containing the levulinate also becomes clear enough to permit the economical recovery of the alkaline earth levulinate. The alkaline earth levulinate can easily be converted to levulinic acid by methods old in the art. Further and total removal of residual color, also in an economical way, is then achieved by the use of activated carbon and/or decolorizing exchange resins.

The method of the present invention includes the following basic steps. Liquor is prepared by the treatment of a sugar solution such as lignocellulosic material with catalytic acids, e.g., mineral or organic acids and preferably acids which produce insoluble salts with alkaline earth bases, which hydrolyze the carbohydrate polymers and convert the sugars to furfural and levulinic acid. Most of the furfural is stripped from the liquor during a cooking operation. The liquor is first treated with base (from the alkaline earth group) to neutralize the liquor and raise the pH high enough to cause the formation of an organic black precipitate from polymerization and decomposition of impurities together with an inorganic precipitate from catalytic acids that eases the flocculation and/or filtration, said formation of precipitates being in the former case substantially aided and accelerated by the action of heat, the whole step being capable of convenient execution under pressure as in a digester. The alkaline filtrate from the first step is then subjected to any of the following treatments in any convenient succession as best suits the character of the liquor being treated and with intervening action of heat, decantation and/or filtration and washing: action of a base to raise the pH on the alkaline side; action of phosphoric acid to produce a precipitate; action of an oxidant at pH above 7 selected from the group hydrogen peroxide, alkali or alkaline earth peroxides or alkali or alkaline earth persulfates. These operations can be repeated and combined in various ways to fit the character of the lignocellulosic material from which the liquor is obtained and the conditions of the hydrolysis.

In particular, the neutralization in the first step can conveniently be achieved by using a natural or residual carbonate such as limestone, witherite, strontianite or alkaline earth muds from other operations. It has also been observed that the precipiate formed in the treatment with hydrogen peroxide has by itself some clarifying action which is enhanced by affecting the precipitation with phosphoric acid right after oxidation and without intermediate filtration, both precipitates, being filtered together. It has also been found that the clarifying action of the phosphate precipitate is best exerted at a temperature ranging from 60–70° C. Finally and unexpectedly, it has been found that treatment with oxidants abates the foaming compounds present. These compounds normally make evaporation under vacuum of the alkanized or neutralized liquor extremely difficult.

The action of hydrogen peroxide and substances capable of liberating the same have been studied at different pH's on the liquor. The results indicate a minimum loss of alkaline earth levulinate at higher pH values (Table III). Some improvement was observed when the pH was kept constant during the oxidation step by the continuous addition of alkaline earth oxide or hydroxide as compared to the action of the oxidants when the pH varies as the oxidation progresses. This is shown in Table IV. It was also found that such an oxidation treatment destroys over 20% of the furfural which is the main impurity and that the treatment with lime or alkaline earth base alone can remove about 40% of the furfural, affecting both treatments as well as other impurities (Table V). The phosphate precipitate has also been found effective in removing from 13% to 20% of the furfural, depending on the conditions of treatment.

For best results the clarification of the liquor is advanced to at least color 4 and preferably to color 2 on the standard Caramel Color Scale. The correlation between color numbers on this scale and optical density at 500 m$\mu$ is shown at Table II.

Tables I–V, discussed above, are presented as follows:

TABLE I

[Increase of Ca-levulinate (as levulinic acid) after lime treatment]

| Sample | Levulinic acid (before liming) (g./l.) | pH after liming | Boiling time (minutes) | Levulinic acid (after liming) (g./l.) | Percent recovery |
|---|---|---|---|---|---|
| IA | 6.17 | 11.5 | 20 | 6.31 | 102.3 |
| IB | 6.17 | 11.5 | 30 | 6.52 | 105.7 |
| IC | 6.17 | 11.5 | 60 | 6.57 | 106.4 |
| ID | 6.17 | 11.5 | 120 | 6.48 | 105.0 |

TABLE II

Standard caramel color scale

| Color No: | Optical density at 500 m$\mu$ |
|---|---|
| 1 | 0.070 |
| 2 | 0.144 |
| 3 | 0.213 |
| 4 | 0.287 |
| 5 | 0.354 |
| 6 | 0.425 |
| 7 | 0.493 |
| 8 | 0.565 |
| 9 | 0.635 |
| 10 | 0.688 |

TABLE III.—ACTION OF HYDROGEN PEROXIDE AT DIFFERENT pH LEVELS ON LIMED LEVULINIC LIQUOR
[20 ml. H$_2$O$_2$ (3%) per liter]

| Sample | pH | Percent loss of— | | Change in color number |
|---|---|---|---|---|
| | | Ca-levulinate | Residual furfural | |
| A | 11.3 | 0 | 20.8 | >10→4 |
| B | 10.0 | 2.20 | 23.0 | >10→4 |
| C | 9.0 | 3.30 | 26.0 | >10→4 |
| D | 8.0 | 3.50 | 28.3 | >10→5.2 |

TABLE IV.—PERCENT YIELD OF LEVULINATE AFTER TREATMENT OF LIMED LIQUORS WITH H$_2$O$_2$

| | Percent yield | | |
|---|---|---|---|
| | (Initial pH 11.5) | (Initial pH 10.5) | (Initial pH 9.5) |
| pH kept constant | 97.66 | 98.0 | 97.7 |
| pH variable | 97.1 | 97.6 | 97.2 |

TABLE V.—ACTION OF LIME TREATMENT ON RESIDUAL FURFURAL

| Sample | pH after liming | Residual furfural |
|---|---|---|
| R-8 | 11.5 | 42 |
| R-9A | 11.5 | 44 |
| R-9B | 11.5 | 39.8 |

It was also found that once the liquors are submitted to the clarifying process herein described they can be further and/or totally decolorized without color reversion by passing them at suitable temperature and concentration through activated carbon or exchange resins. When using activated carbon, optimum decolorizing action on the liquor is affected at a pH close to 6.5. Best adapted to the process of decolorizing the liquors are the resins consisting of highly porous phenolic, hydroxyl and methylol groups.

After decolorizing, the clarified and normally water clear liquor is subjected to concentration by evaporation after adjusting the pH to 8–8.5 for best results and finally the levulinic acid salt is separated by crystallization. The alkaline earth levulinate crystallizes in the case of calcium levulinate on standing at about 58% concentration. The mother liquors can be dealt with in the manner known to the trade for continuous exhaustion.

The following description of various methods of operation shows that the process can easily be adapted to continuous operation. In the description of the preferred methods of operation that follows, "alkaline agent" means any base of the group calcium oxide or hydroxide, barium oxide or hydroxide and natural or residual carbonate or oxide such as limestone or lime muds used in succession or alone as required to bring about the necessary rise in pH. "Oxidizing agent" means an oxidant from the group hydrogen peroxide, alkali peroxides, alkaline earth peroxides, alkali persulfates or alkaline earth persulfates.

DESCRIPTION OF THE DRAWINGS

FIGS. 4–6 disclose further process schemes encompassed by the present invention. These process schemes are readily understandable from the schematic representations set forth in the figures and from the description of FIGS. 1–3 above. The process schemes set forth in FIGS. 4 and 5 are followed in Examples 2 and 3 below.

SPECIFIC EMBODIMENTS

Figure 1:
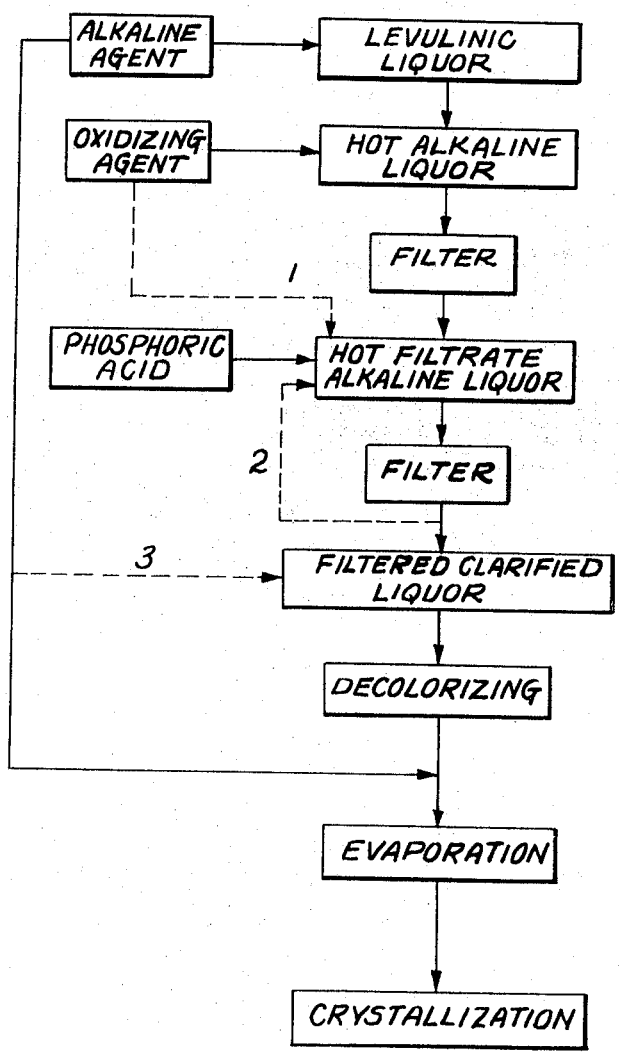
FIG. 1 discloses a process scheme wherein levulinic liquor is treated with "alkaline agent" outside the digester or inside the digester and preferably at a pressure of 50 p.s.i. and corresponding saturation temperature. When treated outside the digester at atmospheric pressure, the liquor, after neutralization (e.g., after treatment with limestone or a residual lime mud), is alkalized to raise the pH above 9.5 and preferably to 11.5 and kept boiling for a period of not over 2 hours and preferably not exceeding twenty minutes. If under pressure, the period does not have to exceed 30 minutes and preferably not five minutes. The hot alkalized liquors are then treated with "oxidizing agent" in an amount usually not exceeding 6% of the levulinic content counting the oxidant as hydrogen peroxide. The oxidant is employed until almost totally spent of its oxidizing power, producing a precipitate in addition to the one caused by the "alkaline agent." Both precipitates are filtered but since they settle readily an equally convenient method could be to decant instead of filtering. The hot alkaline filtrate can be treated with more "oxidizing agent" or all of the "oxidizing agent" can be added to the filtrate (optional step 1). Whatever the path followed, the hot liquor, preferably not below 50° C. for best clarifying action, is then treated with phosphoric acid to lower the pH to around 6.5. A precipitate is formed which affects further removal of color and which flocculates easily so that decantation can be substituted for filtration without loss of efficiency. The filtered clarified liquor may be treated with "alkaline agent" to raise the pH above 9 (optional step 3) and reprecipitated by addition of more phosphoric acid (optional step 2) if the condition of the liquor makes it advisable and if it can be done without detrimental effect to the course of operations. The filtered and clarified liquor with pH adjusted to 6.5 is passed through an activated carbon column maintained at a temperature of 60–80° C. or through an exchange resin of the type previously mentioned, this being optionally followed by activated carbon treatment. Both combinations are implied by "decolorizing." The normally water clear effluent from the "decolorizing" column is treated with "alkaline agent" to adjust its pH to 8–8.5 and evaporated under vacuum. Concentrating to 50–55% solids is usually sufficient, in the case of calcium levulinate, for separation of crystals on standing at room temperature. The mother liquors can be worked out in a continuous manner for exhaustion as is known to the trade in similar operations.
Figure 2:
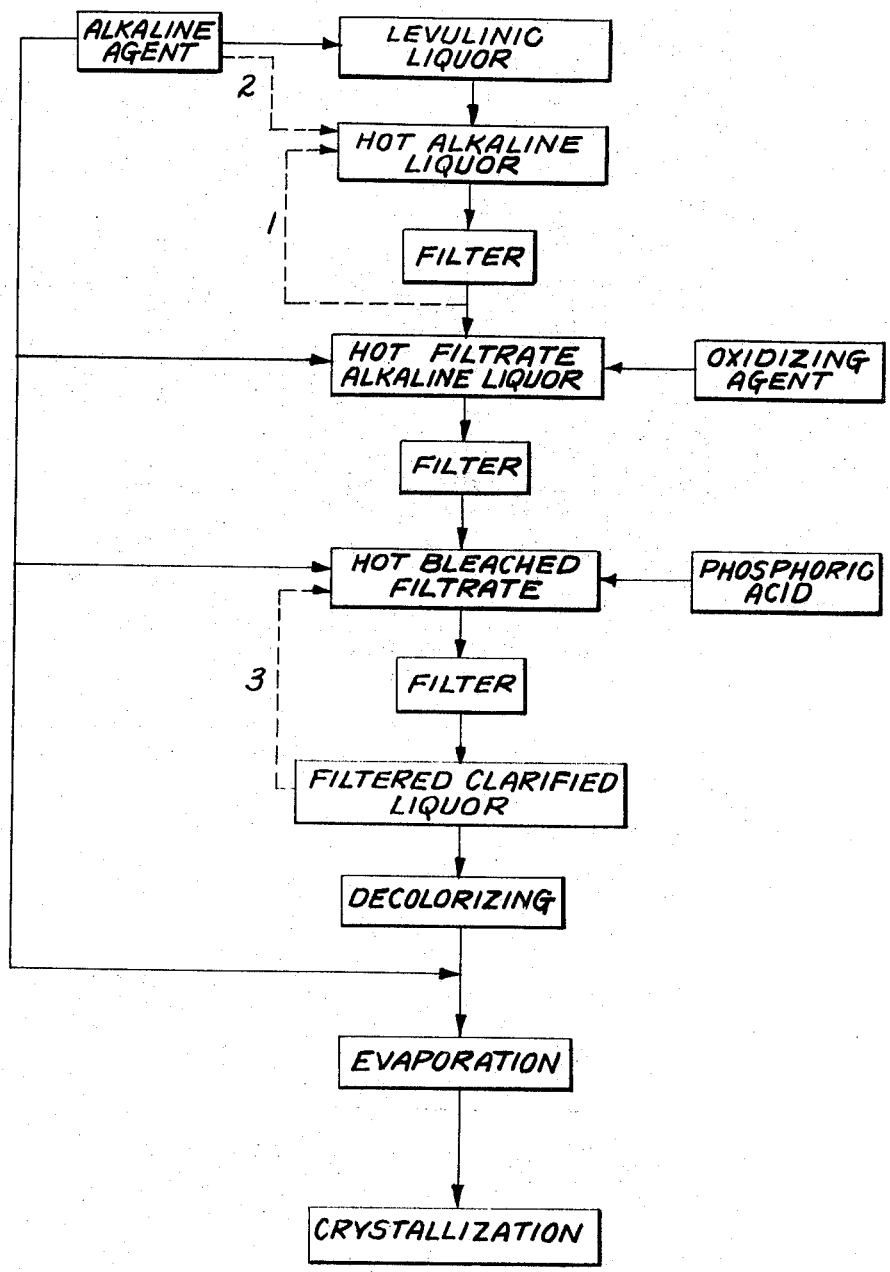
FIG. 2 discloses a process scheme wherein levulinic liquor is treated with "alkaline agent" as referred to in FIG. 1. The precipitate is separated by filtration or decanting and the filtrate or effluent, if necessary, submitted to a second treatment with "alkaline agent" (optional steps 1 and 2). The hot alkaline liquor with pH adjusted above 10 but preferably not less than 10.5 and most preferably at 11.5 is treated with "oxidizing agent." The precipitate from the action of the oxidant, which may be added to the liquor at not less than 60° C. and brought to boiling temperature for a convenient time, usually not exceeding 15 minutes, is decanted or separated by filtration and the hot bleached filtrate with pH adjusted above 9 treated with phosphoric acid, this treatment being repeated if necessary (optional step 3). The clarified liquor at pH 6.5 is decolorized, the pH of the decolorized liquor adjusted to 8–8.5 and evaporated and crystallized as stated above.
Figure 3:
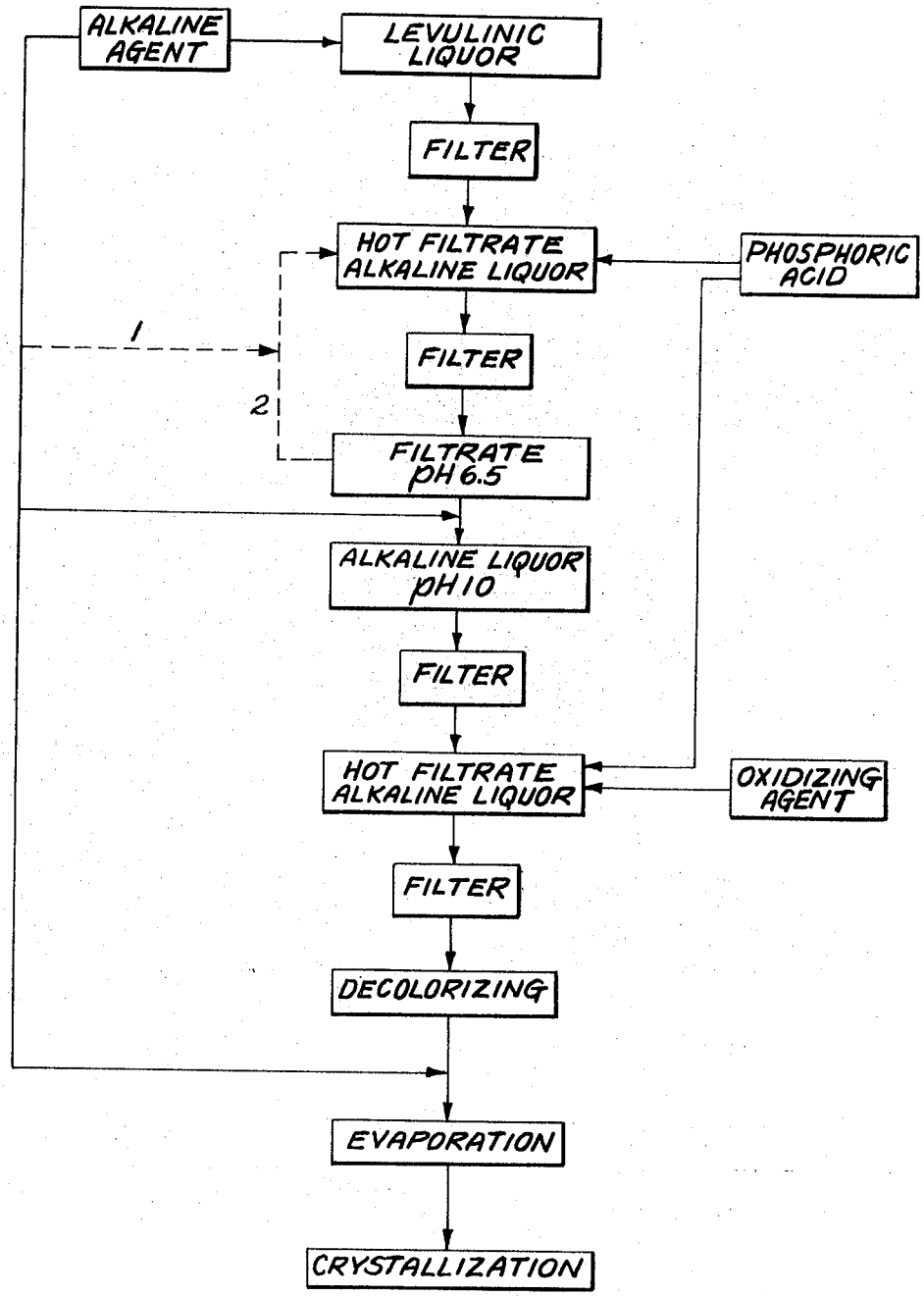
FIG. 3 discloses a process scheme which differs from previously described process schemes in that the treatment with phosphoric acid, in the manner already described, is affected immediately after the treatment of the liquor with "alkaline agent." This treatment being repeated if necessary (optional steps 1 and 2). The filtrate from the phosphoric acid treatment is treated with "alkaline agent" to raise the pH above 10 and filtered or decanted. "Oxidizing agent" is added to the hot filtrate usually when the temperature reaches no less than 60° C., and the filtrate is boiled for not over 15 minutes. Phosphoric acid is then added to bring the pH down to about 6.5 and the combined precipitates decanted or removed by filtration. The clarified liquor is worked out in the manner already described in the preceding processes. The process scheme represented in FIG. 3 is followed in Example 1 described below.
Figure 4:
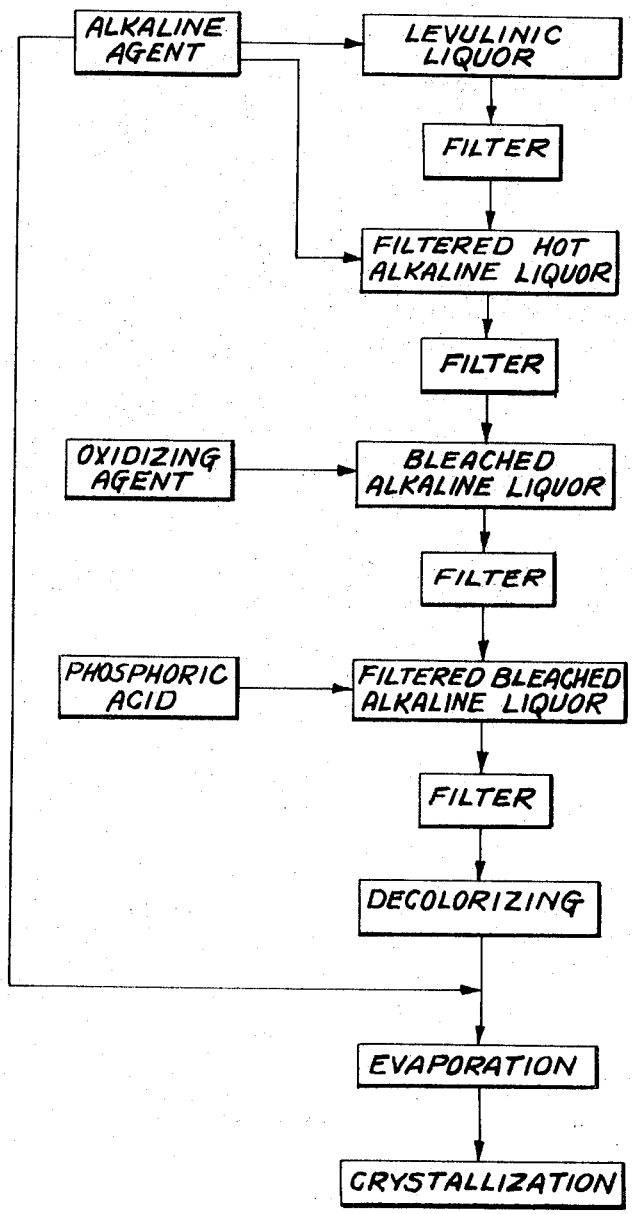
Figure 5:
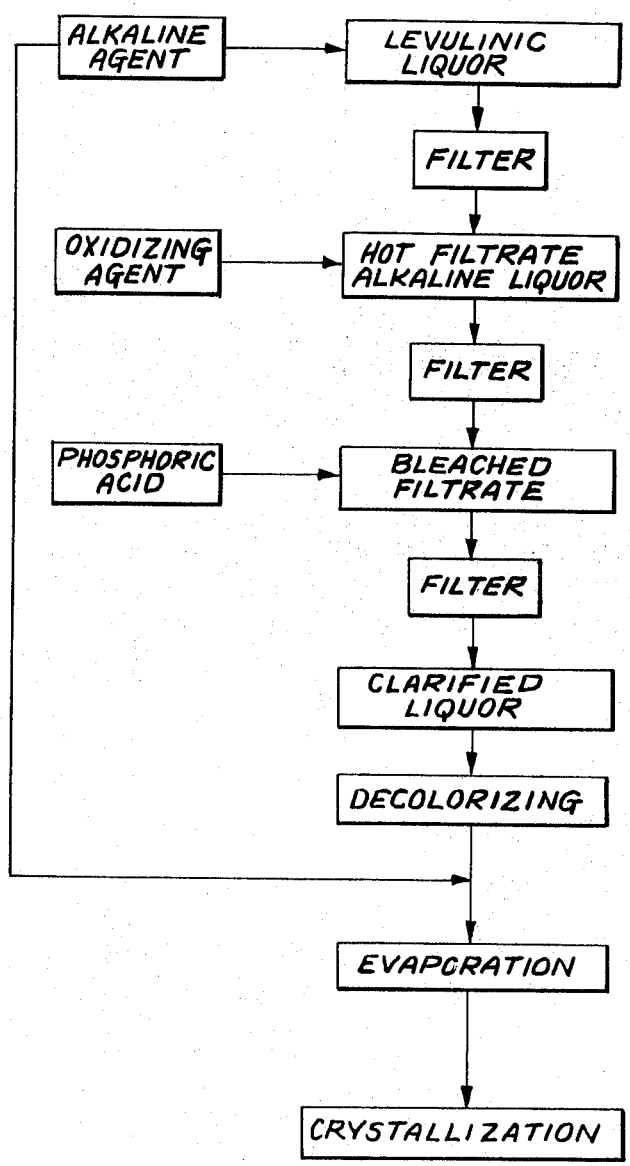

The following non-limitative examples illustrate the invention.

Example 1

Twenty (20) liters of liquor containing 14 g./l. of levulinic acid and 0.70 g./l. of furfural and obtained from the treatment of sugar cane bagasse with dilute sulfuric acid are treated with lime until the pH is raised to 11.5 while heating to boiling for 20 minutes. The bulky precipitate is removed by filtration and washed with hot water. Washings and filtrate showing color 10 on the Caramel Color Scale are treated with phosphoric acid at a temperature of 60–70° C. until the pH drops to 6.5. The precipitate formed is removed by filtration and washed, some filter aid such as Celite being conveniently added. The filtrate together with the washings is treated with lime until the pH is raised to 11.5 and then heated and boiled for 10 minutes. A precipitate is formed, removed by filtration and washed with hot water. To the hot filtrate at 60–70° C. is added 500 ml. of 3% hydrogen peroxide. When a large precipitate appears the whole is boiled for 5 minutes and then phosphoric acid is added to bring the pH down to 6.5. The clarified liquor is filtered. The precipitate is washed with hot water when the clarified liquor shows color number 2 on the Caramel Color Scale. The precipitate is then percolated through an activated carbon column held at 60–75° C. The water clear effluent from the column contains 250 g. of levulinic acid as its calcium salt. Recovery: 92%. This liquor when concentrated and freed from inorganic salts readily crystallizes separating calcium levulinate.

Example 2

Twenty (20) liters of liquor containing 13 g./l. of levulinic acid and obtained from sugar cane bagasse cooked with dilute sulfuric acid are treated with lime to raise the pH to 11.6. The liquor is boiled 20 minutes, filtered and the precipitate washed with hot water. The filtrate is limed to pH 11.7 and boiled for 10 minutes. The precipitate is removed by filtration and washed as before. To the filtrate is added 500 ml. of 3% hydrogen peroxide at a temperature of 60° C. and the filtrate is then heated and boiled for 10 minutes. The precipitate is removed by filtration and washed. To the bleached filtrate at 70° C. is added phosphoric acid to adjust the pH to 6.4. The filtrate is filtered to separate the precipitate. The final color number as corrected for dilution is 2.7 on the Caramel Color Scale. Recovery:

Example 3

Twenty (20) liters of hot levulinic liquor containing 13.8 g./l. of levulinic acid and 0.67 g./l. of furfural and obtained from the digestion of sugar cane bagasse is filtered from humic materials and treated with a lime slurry until the pH is raised to 11.5. The mixture is boiled for 20 minutes and filtered hot. To the hot combined filtrate and washings at 60° C. is added 0.4 liter of 3% hydrogen peroxide solution and the combined mixture is boiled for 10 minutes. After washing the precipitate with hot water and combining the washings and filtrate at a temperature of 60° C., phosphoric acid is added to bring the pH to the 6.5 level. A precipitate is formed, removed by filtration and washed. The final color as corrected for dilution is number 3 on the Caramel Color Scale. The clarified liquor contains 260 g. of levulinic acid in the form of its calcium salt. Recovery: 94.3%.

Example 4

Twenty (20) liters of levulinic liquors obtained from digesting sugar cane bagasse with dilute sulphuric acid under pressure were treated wtih lime (about 16 g./l.) to adjust the pH to 11.5. The liquor was heated to boiling but, before reaching the boiling point at atmospheric pressure, 500 ml. of 3% hydrogen peroxide were slowly added with stirring. After boiling for 20 minutes the precipitate was removed by filtration and washed. The combined filtrate was treated while hot with phosphoric acid to bring the pH down to about 6.5 and then filtered to separate the precipitate. Lime was added to the filtrate (about 6 g./l.) to raise the pH to 11.5. The alkaline filtrate was boiled 10 minutes. The precipitate was removed by filtration, washed and filtered again. To the filtrate is added phosphoric acid to adjust the pH to 6.5. After filtering, the precipitate was washed with hot water. The corrected color number of the liquor is 4 on the Caramel Color Scale. Recovery: 94%. The liquor was decolorized by employing an activated carbon column. Recovery: 98.5%. Overall recovery of levulinic acid as calcium levulinate: 92.6%.

Example 5

Twenty (20) liters of liquor from sugar cane bagasse treated under pressure using mainly sulfuric acid as a catalyst were treated with lime to pH 11.5 and heated to boiling for 15 minutes. The liquor was filtered to separate the precipitate formed and the process repeated a second time. To the hot filtrate was added 6.6 grams of potassium persulfate and the filtrate was heated to boiling for 10 minutes. The precipitate produced by the oxidation was removed by filtration and washed with hot water. The bleached filtrate at 60–70° C. was treated with phosphoric acid and the bulky precipitate removed by filtration and washed. Color number corrected for dilution: 3.5 on the Caramel Color Scale. Recovery: 92.9%.

Example 6

Twenty (20) liters of liquor from the treatment of sugar cane bagasse under pressure by catalytic sulfuric acid solution are limed to pH 11.5–11.7 and the liquor heated to boiling for 20 minutes. The precipitate is removed by filtration. The filtrate was then treated with lime to pH 11.5 and heated to boiling for 15 minutes and the precipitate removed by filtration and the filtrate treated with 50 ml. of hydrogen peroxide (3%) for each liter of filtered liquor and then heated to boiling for 10 minutes whereby the color number decreased to 2 on the Caramel Color Scale. Phosphoric acid was added at 60°

C. to lower the pH to 6.5 and the precipitate was removed by filtration. The clear liquor was run through an activated carbon column. Yield: 95% of the original levulinic acid in the decolorized liquor.

I claim:
1. A method for clarifying levulinic liquor resulting from the action of an acid selected from among the group of organic and inorganic acids precipitatable as insoluble alkaline earth salts on hexose-containing carbohydrate substrates selected from the group consisting of sugar solutions, starch and lignocellulosic material to form a clarified solution containing alkaline earth levulinate which is decolorizable without reversion of color and which yields said alkaline earth levulinate on evaporation and crystallization, comprising treating said levulinic liquor with an alkaline agent selected from the group consisting of natural alkaline earth carbonates, natural alkaline earth muds, alkaline earth hydroxides and alkaline earth oxides to a pH above 10 at a temperature at which said alkaline earth levulinate is soluble in said levulinic liquor and at a pressure from about atmospheric pressure to about four atmospheres, heating the alkaline levulinic liquor and insoluble alkaline earth salt formed by treating said levulinic liquor with said alkaline agent at a temperature above 50° C. with an oxidant selected from the class consisting of hydrogen peroxide, alkali peroxides, alkaline earth peroxides, alkali persulfates, and alkaline earth persulfates, removing said insoluble alkaline earth salt and insoluble products of reaction with said oxidant, and adding alkaline agent to the mother liquors from the removal of said insoluble alkaline earth salt and insoluble products of said reaction with said oxidant to pH above 9.

2. The method of claim 1 wherein the treatment with alkaline earth oxide or hydroxide is effected at pressure above atmospheric.

3. The method of claim 2 wherein phosphoric acid is added to the mother liquor from the removal of said insoluble alkaline earth salt and insoluble products of said reaction with said oxidant at pH above 9 until the pH is below 7 and the resulting product is filtered.

4. The method of claim 2 wherein the temperature in treating with alkaline earth oxide or hydroxide does not exceed 150° C. under saturation pressure and the duration of treatment is for not more than 30 minutes and the initial pH is kept above 10.

5. The method of claim 4 wherein phosphoric acid is added to the mother liquor from the removal of said insoluble alkaline earth salt and insoluble products of said reaction with said oxidant at pH above 9 until the pH is below 7 and the resulting product is filtered.

6. The method of claim 1 wherein the treatment of levulinic liquors with alkaline earth oxides or hydroxides raises the pH above 12 and wherein the alkalized liquors are heated to 100° C. for a time not exceeding two hours.

7. The method of claim 6 wherein phosphoric acid is added to the mother liquor from the removal of said insoluble alkaline earth salt and insoluble products of said reaction with said oxidant at pH above 9 until the pH is below 7 and the resulting product is filtered.

8. The method of claim 1 wherein the precipitate of said insoluble alkaline earth salt formed by treating said levulinic liquor with said alkaline agent is removed by filtration at atmospheric pressure and the filtered liquid is treated with said oxidant at a temperature above 50° C. in an amount up to 10% by weight of levulinate salt, or in an amount required to bring down the color number to 4 or below on the standard Caramel Color Scale.

9. The method of claim 8 wherein the initial pH is kept above 9.5 during the treatment with said oxidant by the addition of suitable base.

10. The method of claim 9 wherein the pH is kept at a constant level above pH 9.5 by the constant addition of a suitable base during the whole period of action of said oxidant.

11. The method of claim 9 wherein the levulinic liquor from which said alkaline earth salt has been removed by filtration is acidified with phosphoric acid to pH below 6.5 and filtered to remove insoluble material before treatment with the oxidant.

12. The method of claim 8 wherein insoluble products of the treatment with said oxidant at a temperature above 50° C. are separated by filtration and the filtrate, after having been raised above pH 9, is treated with phosphoric acid until the pH reaches a level between 6 and 7, and the resulting product is filtered.

13. The method of claim 12 wherein the liquor is kept at a temperature above 50° C. during the treatment with phosphoric acid.

14. The method of claim 12 wherein the addition of phosphoric acid is accomplished without previous separation of the precipitate obtained by the action of said oxidant, to produce a total combined precipitate to be separated as a whole by filtration.

15. The method of claim 1 wherein the treatment with said alkaline agent after neutralization of the levulinic liquors is advanced until the pH is raised to 11–11.7, said treatment being followed by heating at 100° C.–150° C. for a period of time less than two hours, the treatment with said oxidant being conducted at a pH between 10–11.5 and at a temperature above 50° C. up to boiling at normal pressure; bringing the pH of the mother liquors from the removal of said insoluble alkaline earth salt and said insoluble product of said reaction with said oxidant to pH between 10.0 and 11.7 by adding alkaline earth oxide or hydroxide and then adding phosphoric acid until the pH goes down to 6.5, the temperature being kept between 60–70° C.

16. The process of claim 15 wherein enough oxidant is added to bring the color number on the standard Caramel Color Scale in the range 4–2 and then phosphoric acid is used after the oxidant treatment to bring the pH to 6–6.5 level, the precipitate being separated by filtration and the clear liquor decolorized by treatment with a decolorizing agent selected from the group consisting of activated charcoal and hydroxylated, methylolated, and phenolic ion exchange resins.

17. The method of claim 1 wherein phosphoric acid is added to the mother liquors from the removal of said insoluble alkaline earth salt and insoluble products of said reaction with said oxidant at pH above 9 until the pH is below 7 and the resulting product is filtered.

References Cited
UNITED STATES PATENTS

| | | | |
|---|---|---|---|
| 2,270,328 | 1/1942 | Moyer | 260—528 |
| 2,349,514 | 5/1944 | Moyer | 260—526 |

LORRAINE A. WEINBERGER, Primary Examiner

V. GARNER, Assistant Examiner

U.S. Cl. X.R.

260—528